US012572275B2

(12) United States Patent
Kesavan et al.

(10) Patent No.: US 12,572,275 B2
(45) Date of Patent: Mar. 10, 2026

(54) REAL-TIME ANALYSIS FOR DYNAMIC STORAGE

(71) Applicant: NetApp Inc., San Jose, CA (US)

(72) Inventors: Sachithananthan Kesavan, Karnataka (IN); Rajesh Nagarajan, Tamil Nadu (IN); Nandakumar Ravindranath Allu, Tamil Nadu (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/451,865

(22) Filed: Aug. 18, 2023

(65) Prior Publication Data

US 2023/0393735 A1      Dec. 7, 2023

Related U.S. Application Data

(63) Continuation of application No. 16/945,301, filed on Jul. 31, 2020, now Pat. No. 11,733,865, which is a continuation of application No. 16/015,928, filed on Jun. 22, 2018, now Pat. No. 10,768,817, which is a continuation of application No. 14/813,269, filed on Jul. 30, 2015, now abandoned.

(51) Int. Cl.
*G06F 3/06* (2006.01)

(52) U.S. Cl.
CPC .......... *G06F 3/0605* (2013.01); *G06F 3/0631* (2013.01); *G06F 3/0665* (2013.01); *G06F 3/067* (2013.01); *G06F 2212/154* (2013.01); *G06F 2212/217* (2013.01); *G06F 2212/263* (2013.01)

(58) Field of Classification Search
CPC .... G06F 3/0605; G06F 3/0631; G06F 3/0665; G06F 3/067; G06F 2212/154; G06F 2212/217; G06F 2212/263
See application file for complete search history.

(56) References Cited

U.S. PATENT DOCUMENTS

| | | | |
|---|---|---|---|
| 8,555,022 B1 * | 10/2013 | Edwards | G06F 3/0685 711/170 |
| 8,838,891 B2 | 9/2014 | Bert | |
| 9,032,160 B1 | 5/2015 | Natanzon et al. | |
| 10,095,425 B1 * | 10/2018 | Martin | G06F 3/0665 |
| 10,768,817 B2 | 9/2020 | Kesavan et al. | |
| 2004/0088417 A1 | 5/2004 | Bober et al. | |

(Continued)

*Primary Examiner* — Nanci N Wong
(74) *Attorney, Agent, or Firm* — Cooper Legal Group LLC

(57) ABSTRACT
One or more techniques and/or systems are provided for dynamically provisioning logical storage pools of storage devices for applications. For example, a logical storage pool, of one or more storage devices, may be constructed based upon a service level agreement for an application (e.g., an acceptable latency, an expected throughput, etc.). Real-time performance statistics of the logical storage pool may be collected and evaluated against the service level agreement to determine whether a storage device does not satisfy the service level agreement. For example, a latency of a storage device within the logical storage pool may increase overtime as log files and/or other data of the application increase. Accordingly, a new logical storage pool may be automatically and dynamically defined and provisioned for the application to replace the logical storage pool. The new logical storage pool may comprise storage devices expected to satisfy the storage level agreement.

20 Claims, 12 Drawing Sheets

(56)                References Cited

U.S. PATENT DOCUMENTS

| | | | | |
|---|---|---|---|---|
| 2006/0136691 | A1* | 6/2006 | Brown | G06F 3/0617 711/165 |
| 2007/0074220 | A1 | 3/2007 | Edwards et al. | |
| 2008/0172539 | A1 | 7/2008 | Boss et al. | |
| 2008/0301255 | A1* | 12/2008 | He | H04L 67/5682 709/214 |
| 2010/0122020 | A1 | 5/2010 | Sikdar et al. | |
| 2011/0022641 | A1 | 1/2011 | Werth et al. | |
| 2011/0197046 | A1* | 8/2011 | Chiu | G06F 3/0617 711/171 |
| 2012/0005435 | A1* | 1/2012 | Emaru | G06F 3/061 711/E12.001 |
| 2012/0011517 | A1* | 1/2012 | Smith | G06F 11/3072 715/224 |
| 2012/0054768 | A1* | 3/2012 | Kanna | G06F 9/5027 718/104 |
| 2012/0317358 | A1* | 12/2012 | Ando | G06F 3/067 711/E12.002 |
| 2013/0073806 | A1* | 3/2013 | Xavier | G06F 11/3485 711/170 |
| 2013/0151774 | A1* | 6/2013 | Bolik | G06F 11/3485 711/E12.017 |
| 2013/0204849 | A1* | 8/2013 | Chacko | G06F 3/0664 707/692 |
| 2013/0332588 | A1* | 12/2013 | Maytal | G06F 11/3428 709/223 |
| 2014/0108759 | A1 | 4/2014 | Iwamitsu et al. | |
| 2014/0130055 | A1* | 5/2014 | Guha | G06F 9/5011 718/104 |
| 2014/0181455 | A1 | 6/2014 | Wang et al. | |
| 2015/0154211 | A1* | 6/2015 | Matsubara | G06F 16/13 707/812 |
| 2015/0254088 | A1* | 9/2015 | Chou | H04L 67/1097 718/1 |
| 2015/0347047 | A1 | 12/2015 | Masputra et al. | |
| 2015/0363282 | A1* | 12/2015 | Rangasamy | G06F 11/2033 714/4.12 |
| 2016/0004475 | A1 | 1/2016 | Beniyama et al. | |
| 2016/0011816 | A1 | 1/2016 | Aizman | |
| 2017/0031600 | A1 | 2/2017 | Kesavan et al. | |
| 2017/0242774 | A1* | 8/2017 | Gopu | H04L 67/10 |
| 2018/0115927 | A1 | 4/2018 | Vesterinen et al. | |
| 2020/0363959 | A1 | 11/2020 | Kesavan et al. | |

* cited by examiner

300

IDENTIFY SERVICE LEVEL AGREEMENT FOR APPLICATION — 302

EVALUATE STORAGE ENVIRONMENT TO IDENTIFY POOL OF STORAGE DEVICES AVAILABLE FOR HOSTING DATA OF APPLICATION — 304

CONSTRUCT LOGICAL STORAGE POOL COMPRISING ONE OR MORE STORAGE DEVICE SELECTED BASED UPON THE SERVICE LEVEL AGREEMENT — 306

PROVISION LOGICAL STORAGE POOL FOR APPLICATION — 308

REAL-TIME ANALYSIS FOR DYNAMIC STORAGE

RELATED APPLICATION

This application claims priority to and is a continuation of U.S. patent application Ser. No. 16/945,301, filed on Jul. 31, 2020 and titled "REAL-TIME ANALYSIS FOR DYNAMIC STORAGE," which application claims priority to and is a continuation of U.S. Pat. No. 10,768,817, filed on Jun. 22, 2018 and titled "REAL-TIME ANALYSIS FOR DYNAMIC STORAGE," which claims priority to and is a continuation of U.S. patent application Ser. No. 14/813,269, filed on Jul. 30, 2015 and titled "REAL-TIME ANALYSIS FOR DYNAMIC STORAGE," which are incorporated herein by reference.

BACKGROUND

Many computing environments, such as datacenters or other storage environments, may be configured to provide various clients with access to computing resources, such as data storage. A storage administrator may provision one or more storage devices for use by a client, such as to store data of an application. For example, a database application may store a database within a volume of a storage device provisioned by the storage administrator to a client hosting the database application. Various types of storage devices may be available for the storage administrator to provision, such as cloud storage, a solid state drive (SSD), virtual storage, a logical unit number (LUN) array, a tape drive, a serial attached small computer system interface (SAS) storage device, a serial advanced technology attachment (SATA) storage device, etc. The storage administrator may manually select and configure the one or more storage devices for provisioning based upon theoretical data and personal experience regarding what storage devices may satisfy a service level agreement (SLA) such as a desired throughput, data loss protection, an acceptable latency (e.g., a data retrieval latency of database data from the storage device), and/or other performance characteristics associated with the database application. Unfortunately, manual configuration may be cumbersome and imprecise, which may result in inefficient allocation and utilization of resources of a storage environment.

Overtime, the application may experience degraded performance from the provisioned storage devices of the storage environment due to increases in data being stored and managed, increased log data, increased workloads, and/or management of other values and information that may decrease performance. The storage administrator may have to manually create a new group of storage devices to provision for the application. The storage administrator may take the application offline, migrate data to the new group of storage devices, and provision the new group of storage devices for use by the application. Manual configuration and/or reconfiguration of storage devices for provisioning to applications may result in reduced performance of applications, inefficient utilization of computing resources of a storage environment, and cumbersome and imprecise manual selection and configuration efforts by storage administrators.

DETAILED DESCRIPTION

Figure 1:
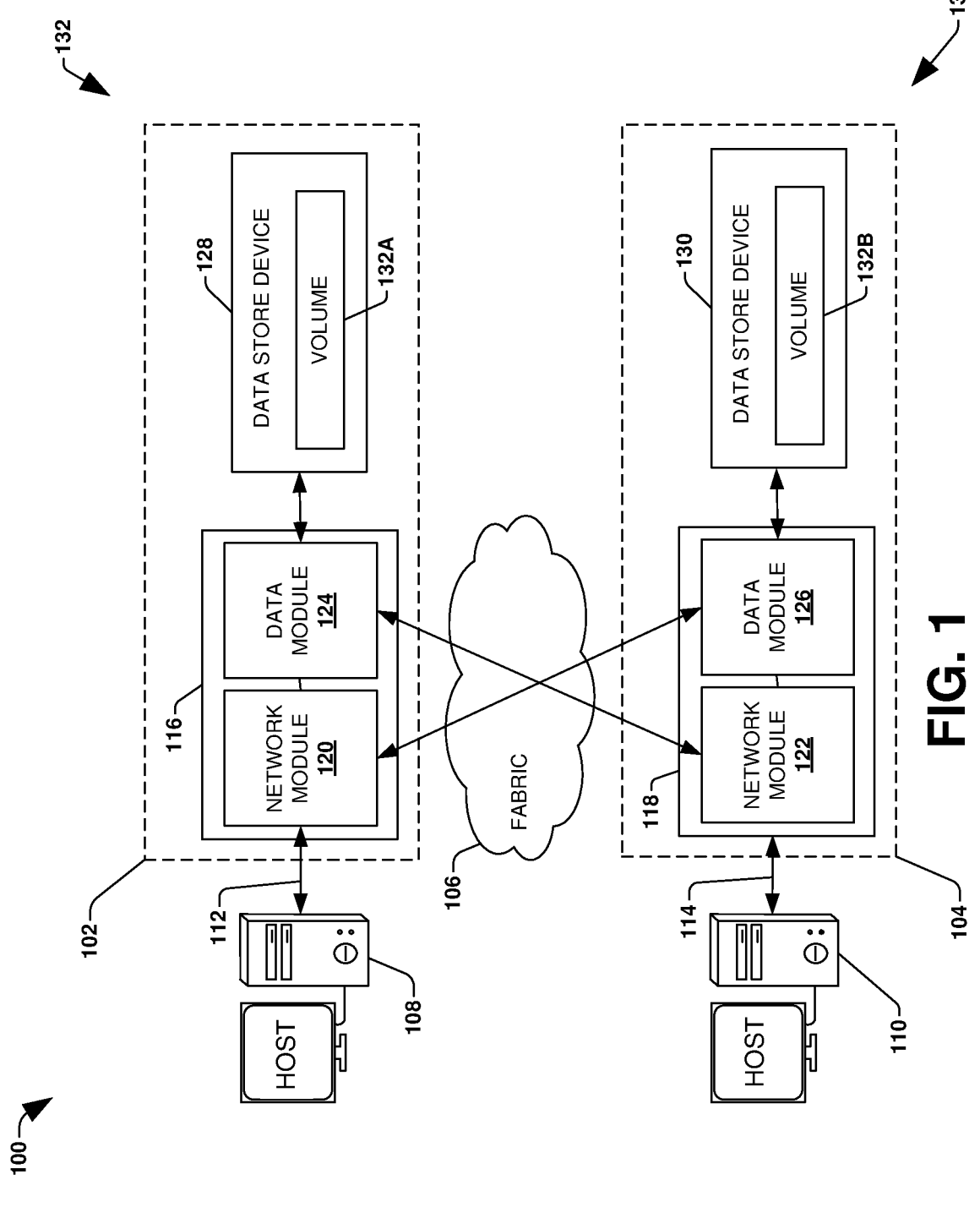
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for dynamically provisioning a logical storage pool of storage devices for an application are provided. A logical storage pool, of one or more storage device types that are automatically selected based upon a service level agreement for an application, may be dynamically constructed and provisioned for the application, which may reduce error and/or inefficiencies otherwise introduced by manual configuration and provisioning by a storage administrator. Real-time performance statistics of the provisioned storage devices hosting data of the application may be collected, and compared to the service level agreement. If a storage device does not satisfy the service level agreement, a replacement storage device type may be automatically selected to dynamically replace the storage device so that the service level agreement may be satisfied, which may increase performance of the application in a dynamic and automated manner as opposed to waiting on the storage administrator to manually configure a new storage pool.

To provide context for dynamically provisioning a logical storage pool of storage devices for an application, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that dynamic provisioning of a logical storage pool may be implemented within the clustered network environment 100. For example, a dynamic storage provisioning component may be implemented for the node 116 and/or the node 118. The dynamic storage provisioning component may be configured to automatically and dynamically provision and/or reprovision storage, such as volume 132A of data storage device 128 and/or volume 132B of data storage device 130, for use by an application hosted on host device 108 and/or host device 110.

Figure 2:
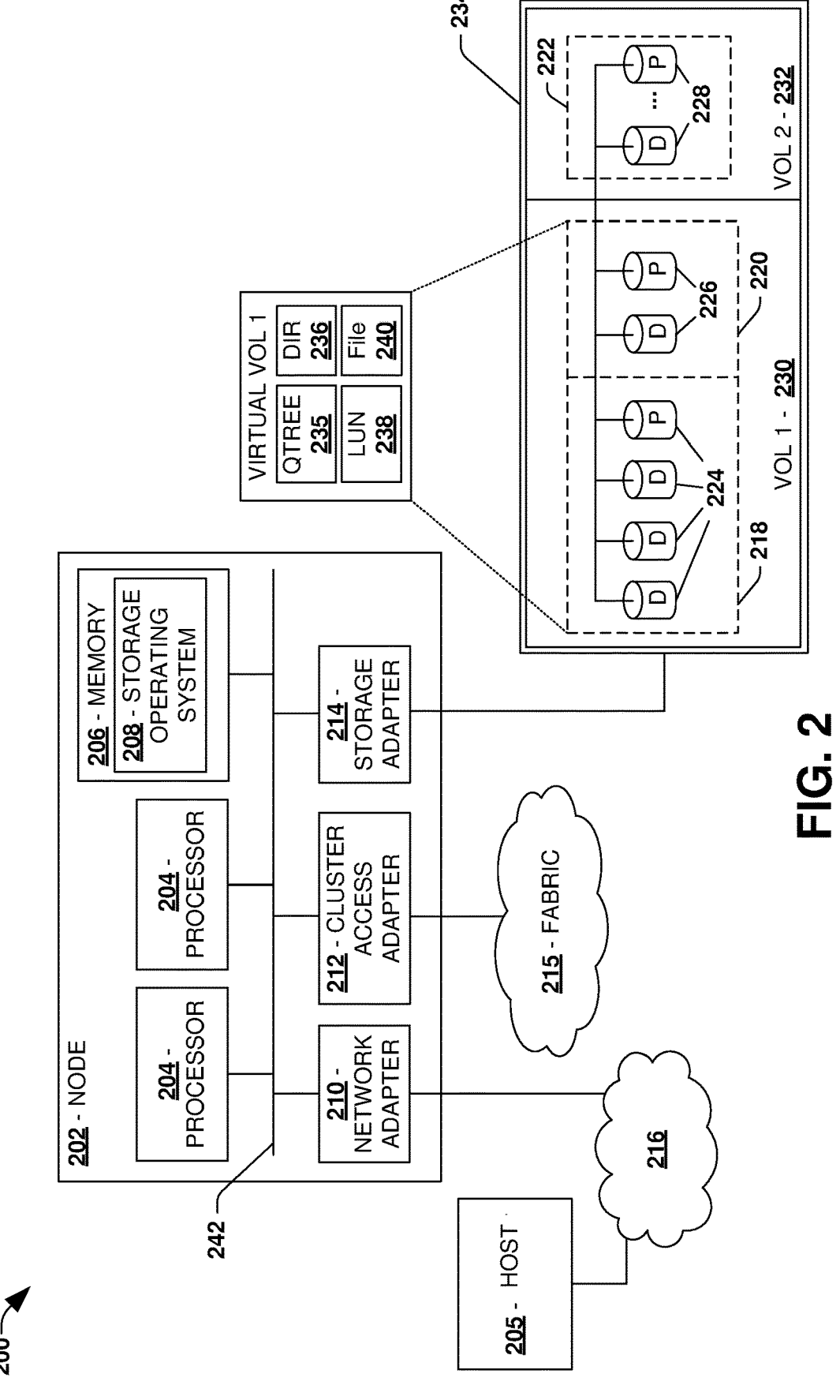
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that dynamic provisioning of a logical storage pool may be implemented for the data storage system 200. For example, a dynamic storage provisioning component may be implemented for the node 202. The dynamic storage provisioning component may be configured to automatically and dynamically provision and/or reprovision storage, such as disks 224, 226, and/or 228, for use by an application hosted on host device 205.

Figure 3:
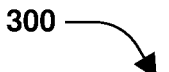
FIG. 3 is a component block diagram illustrating an exemplary system for dynamically provisioning a logical storage pool of storage devices for an application.
Figure 3:
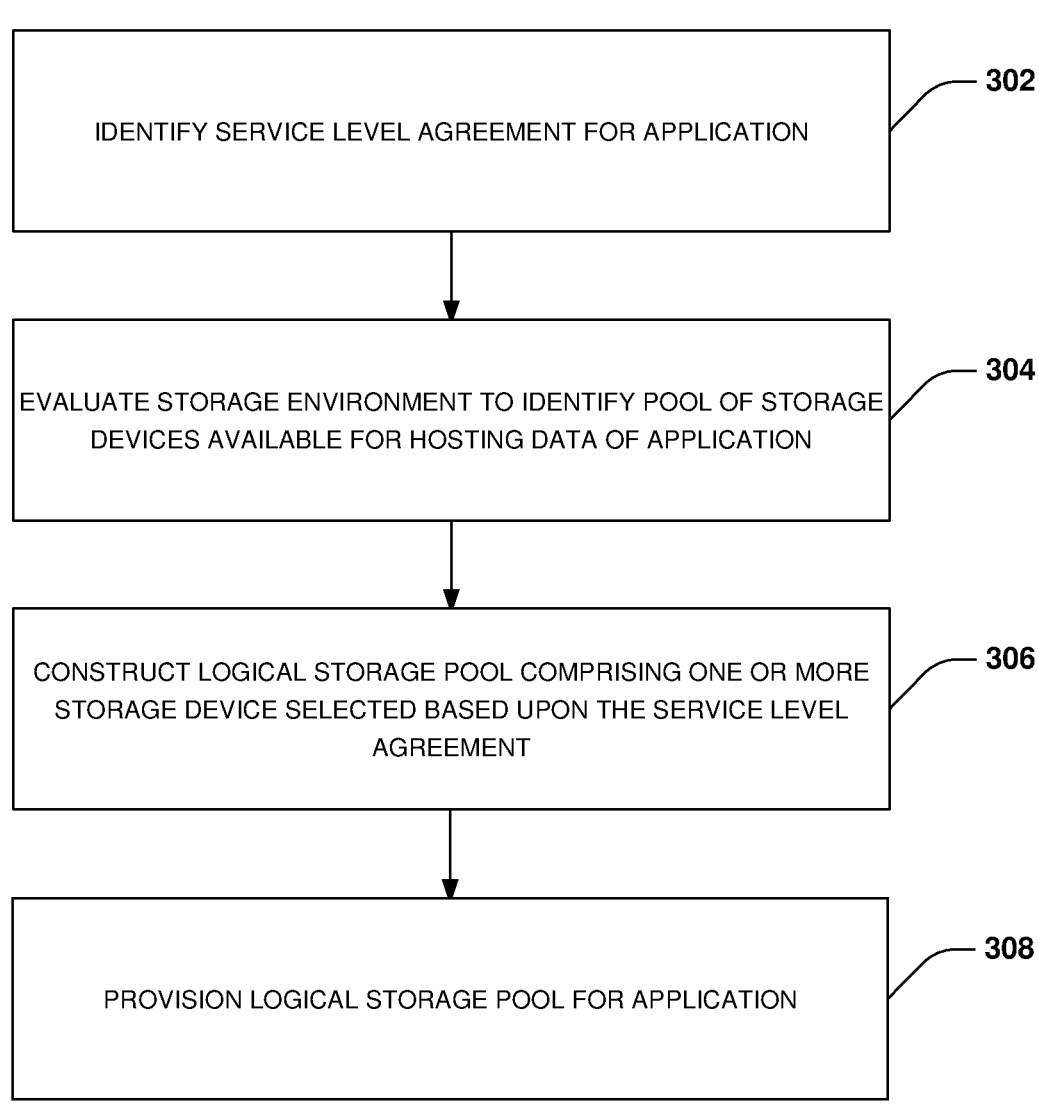

One embodiment of dynamically provisioning a logical storage pool of storage devices for an application is illustrated by an exemplary method 300 of FIG. 3. A storage environment, such as a datacenter, may be configured to provide computing resources, such as data storage, to applications of clients. At 302, a service level agreement (SLA) for an application, such as a database application, may be identified. For example, the SLA may specify performance metrics, desired throughput, acceptable latency, data loss prevention, and/or other levels of service requested from the storage environment by the database application.

At 304, the storage environment may be evaluated to identify a pool of storage device types that are available for hosting data of the application. For example, the storage environment may be queried to determine that various storage devices, such as cloud storage, a solid state drive (SSD) storage device, virtual storage, a logical unit number (LUN) array, a tape drive, a serial attached small computer system interface (SAS) storage device, a serial advanced technology attachment (SATA) storage device, etc., are available for hosting database data of the database application. At 306, a logical storage pool, comprising one or more storage devices selected from the pool of storage devices based upon the SLA, may be constructed. For example, latency, throughput, revolutions per minute (RPM), network connection bandwidth to cloud storage, data loss prevention characteristics, cost, storage size, and/or a variety of other performance characteristics of storage devices may be compared to the SLA to identify the one or more storage devices that have a probability of satisfying the SLA above a threshold probability (e.g., historical performance statistics, current real-time performance statistics, and/or manufacturer specification performance statistics may be evaluated). For example, an SSD storage device and a 10 k RPM SATA storage device may be selected for inclusion within the logical storage pool. It may be appreciated that any number of storage devices may be included within a logical storage pool, and that any number of logical storage pools may be constructed for the application.

At 308, the logical storage pool may be provisioned for the application. For example, one or more volumes and/or one or more logical unit numbers (LUNs) may be created across at least one storage device of the logical storage pool for use by the database application. In an example, the database application may be instructed and/or configured to store database data within the logical storage pool, such as within the SSD storage device and/or the 10 k RPM SATA storage device (e.g., the database application may be configured to store data within a volume created within the logical storage pool). In another example, the storage of the database data may be transparent to the database application, and thus the storage environment may be configured to store the database data within the logical storage pool, such as within the SSD storage device and/or the 10 k RPM SATA storage device, on behalf of the database application.

Real-time performance statistics, associated with the one or more storage devices of the logical storage pool hosting the data of the application, may be collected from the storage environment and/or from the application. The real-time performance statistics may correspond to latency, throughput, bandwidth, and/or a variety of other performance metrics associated with operation of the database application and/or storage of the database data (e.g., a latency associated with the database application retrieving database data from the logical storage pool).

In an example, the real-time performance statistics may be compared with the SLA to determine whether a storage device does not satisfy the SLA. For example, latency of the 10 k RPM SATA storage device may have increased over-time due to an increase in management of database logs and data, and thus the 10 k RPM SATA storage device may be identified as not satisfying a latency metric of the SLA. A replacement storage device, such as cloud storage, may be identified as a replacement for the 10 k RPM SATA storage device because the cloud storage may have a probability of satisfying the SLA above a threshold probability (e.g., measured latency of the cloud storage may satisfy the latency metric of the SLA).

In an example, the replacement storage device may be used to replace the storage device, and data may be migrated from the storage device to the replacement storage device (e.g., the cloud storage may be used to replace the 10 k RPM SATA storage device within the logical storage pool). In an example of migrating data, the data may be migrated in a background (e.g., migrated by a storage controller within the storage environment; migrated by a background task; migrated by a service as opposed to a front-end application; etc.) without impacting front-end applications such as the database application. In another example, a new logical storage pool may be defined to comprise the storage devices that satisfied the SLA, such as the SSD storage device, and the replacement storage device such as the cloud storage used to replace the 10 k RPM SATA storage device. Data may be migrated (e.g., in the background) from the 10 k RPM SATA storage device to the cloud storage. In an example, the new logical storage pool may be provisioned for the application, such as automatically (e.g., without manual intervention or configuration by a storage administrator) and dynamically during real-time operation of the storage environment in response to the real-time performance statistics indicating that the 10 k RPM SATA storage device does not satisfy the SLA. In another example, the new logical storage pool may be provided to the storage administrator as a suggestion. In response to receiving a new provision command from the storage administrator in response to the suggestion, the migration and provisioning may be performed. The 10 k RPM SATA storage device may be released into an available storage pool of the storage environment for later provisioning for applications.

In an example where storage resources may have been overprovisioned, the real-time performance statistics may be compared with the SLA to identify a storage device that satisfies the SLA, such as the SSD storage device. A second storage device, such as a $3^{rd}$ party LUN array, may be identified as satisfying the SLA (e.g., measured performance of the $3^{rd}$ party LUN array may indicate that a latency of the $3^{rd}$ party LUN array may be below the latency metric of the SLA). Responsive to a cost (e.g., a monetary cost, such as an initial cost, recurring fees, and/or maintenance costs) of the storage device exceeding a second cost of the second storage device, a new logical storage pool may be defined to comprise the storage devices that satisfy the SLA (e.g., the cloud storage) and the second storage device, such as the $3^{rd}$ party LUN array used to replace the SSD storage device. Data may be migrated (e.g., in the background) from the SSD storage device to the $3^{rd}$ party LUN array. The new logical storage pool, comprising the $3^{rd}$ party LUN array and the cloud storage as a replacement for the SSD storage device, may be provisioned for the application. In this way, costs associated with hosting data of the application may be reduced without sacrificing performance of the application.

In an example, a client may update the SLA for the application, such as by specifying a new acceptable latency for the database application accessing database data stored within the storage environment. Real-time performance statistics may be compared with the updated SLA to identify a storage device that does not satisfy the updated SLA. For example, the cloud storage may be identified as not satisfying the updated SLA. A new logical storage pool, comprising storage devices that satisfy the updated SLA and a replacement storage device, such as a second SSD storage device, used to replace the cloud storage that does not satisfy the updated SLA, may be defined. Data may be migrated from the cloud storage to the second SSD storage device. The new logical storage pool, comprising the second SSD storage device and the $3^{rd}$ party LUN array, may be provisioned for the database application.

In an example where multiple logical storage pools may be provisioned for applications, a set of logical storage pools may be constructed for the application based upon the SLA. The set of logical storage pools may be provisioned for the application. In an example, the set of logical storage pools may comprise a first logical storage pool, a second logical storage pool, and/or other logical storage pools. The first logical storage pool may comprise a first storage device, a second storage device, and/or other storage devices. The second logical storage pool may comprise a third storage device, a fourth storage device, and/or other storage devices. The storage devices of the logical storage pools may have similar storage device types or dissimilar storage device types (e.g., the first logical storage pool may comprise cloud storage and a SATA storage device; the second logical storage pool may comprise an SSD storage device, etc.). Real-time performance statistics may be collected for the set of logical storage pools hosting data of the application. A logical storage pool may be determined as not satisfying the SLA based upon the real-time performance statistics. Data may be migrated (e.g., in the background) from the logical storage pool to a different logical storage pool (e.g., migrated to a new or existing logical storage pool) that will satisfy the SLA.

Figure 4A:
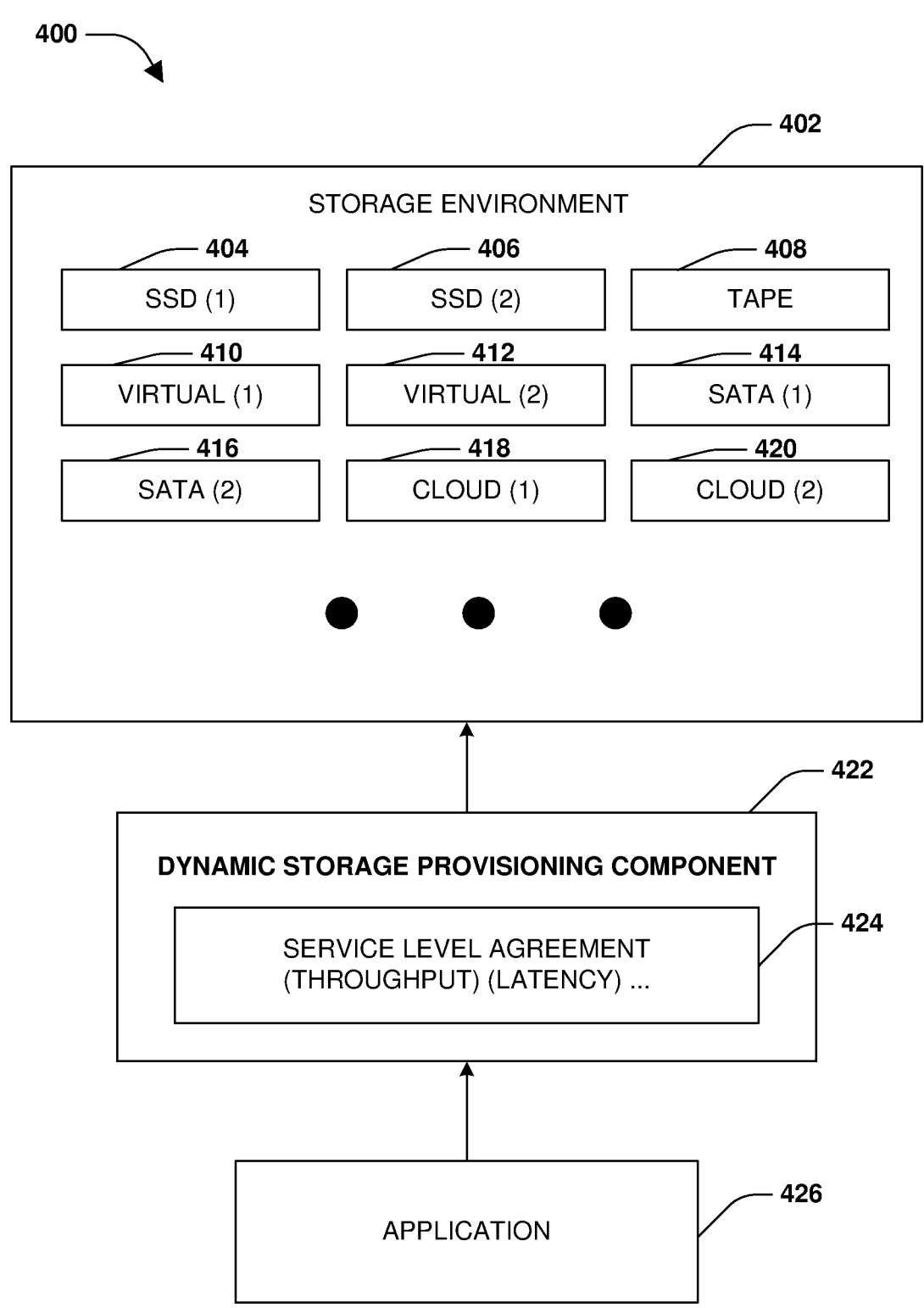
FIG. 4A is a component block diagram illustrating an exemplary system for dynamically provisioning a logical storage pool, where a pool of storage devices are identified.

FIGS. 4A-4E illustrate examples of a system 400, comprising a dynamic storage provisioning component 422, for dynamically provisioning one or more logical storage pools of storage devices for an application 426. FIG. 4A illustrates the dynamic storage provisioning component 422 identifying a service level agreement (SLA) 424 for the application 426. The SLA 424 may specify various data access and/or performance metrics that are to be provided to the application 426 by a storage environment 402. The dynamic storage provisioning component 422 may evaluate the storage environment 402 to identify a pool of storage devices available for hosting data of the application 426. For example, the pool of storage devices may comprise a first SSD storage device 404, a second SSD storage device 406, a tape drive 408, first virtual storage 410, second virtual storage 412, a first SATA storage device 414, a second SATA storage device 416, first cloud storage 418, second cloud storage 420, and/or other storage devices or services.

Figure 4B:
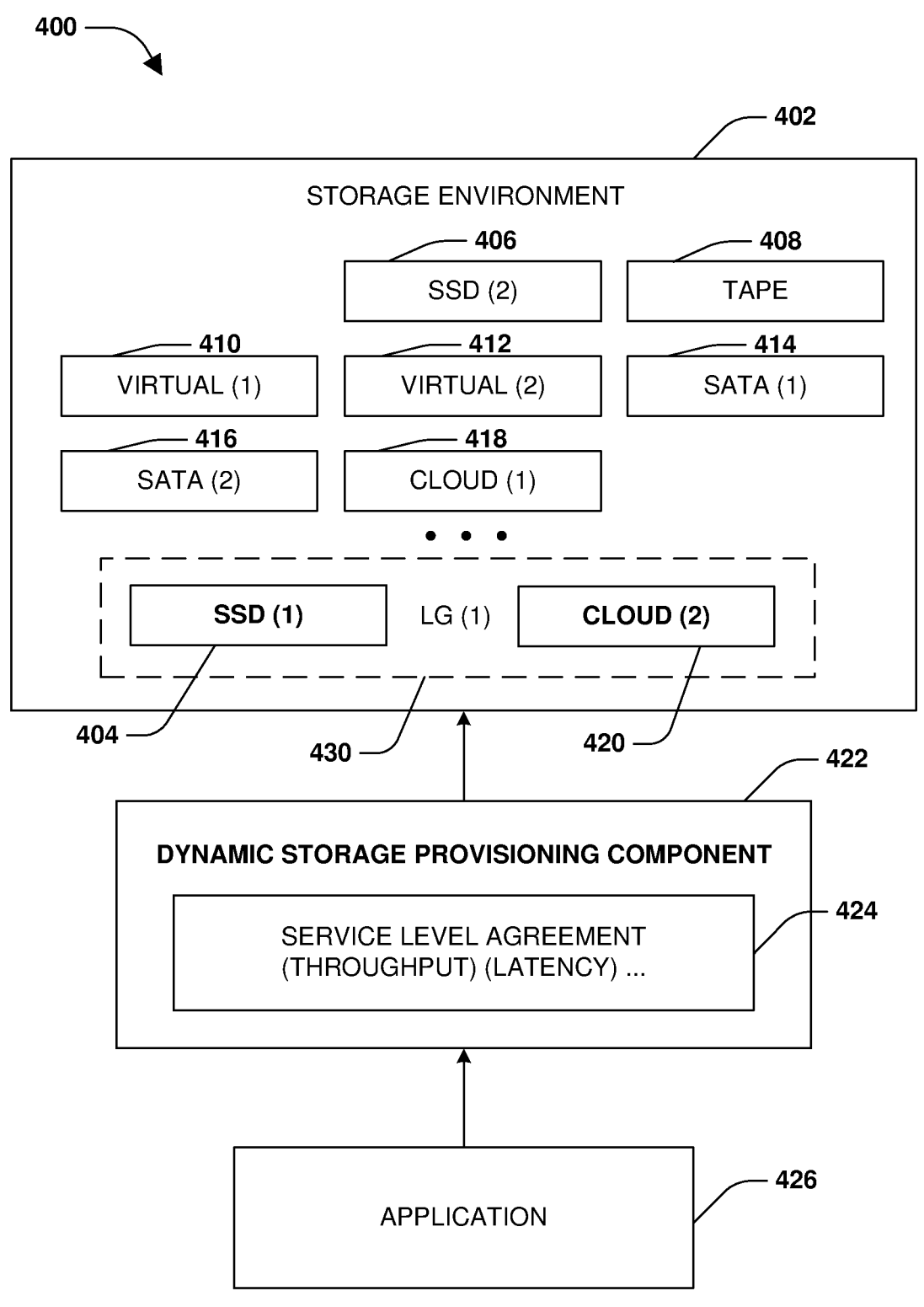
FIG. 4B is a component block diagram illustrating an exemplary system for dynamically provisioning a logical storage pool, where a first logical storage pool is provisioned.

FIG. 4B illustrates the dynamic storage provisioning component 422 constructing a first logical storage pool 430 to comprise the first SSD storage device 404 and the second cloud storage 420. The dynamic storage provisioning component 422 may select the first SSD storage device 404 and the second cloud storage 420 based upon the storage devices providing data access and performance that will satisfy the service level agreement 424 of the application 426. For example, real-time performance statistics, historic performance statistics, and/or manufacture specified performance statistics may be used by the dynamic storage provisioning component 422 to select the first SSD storage device 404 and the second cloud storage 420 for inclusion within the first logical storage pool 430. The dynamic storage provisioning component 422 may provision the first logical storage pool 430 for the application 426. In this way, data of the application 426 may be stored within the first logical storage pool 430 of the storage environment 402.

Figure 4C:
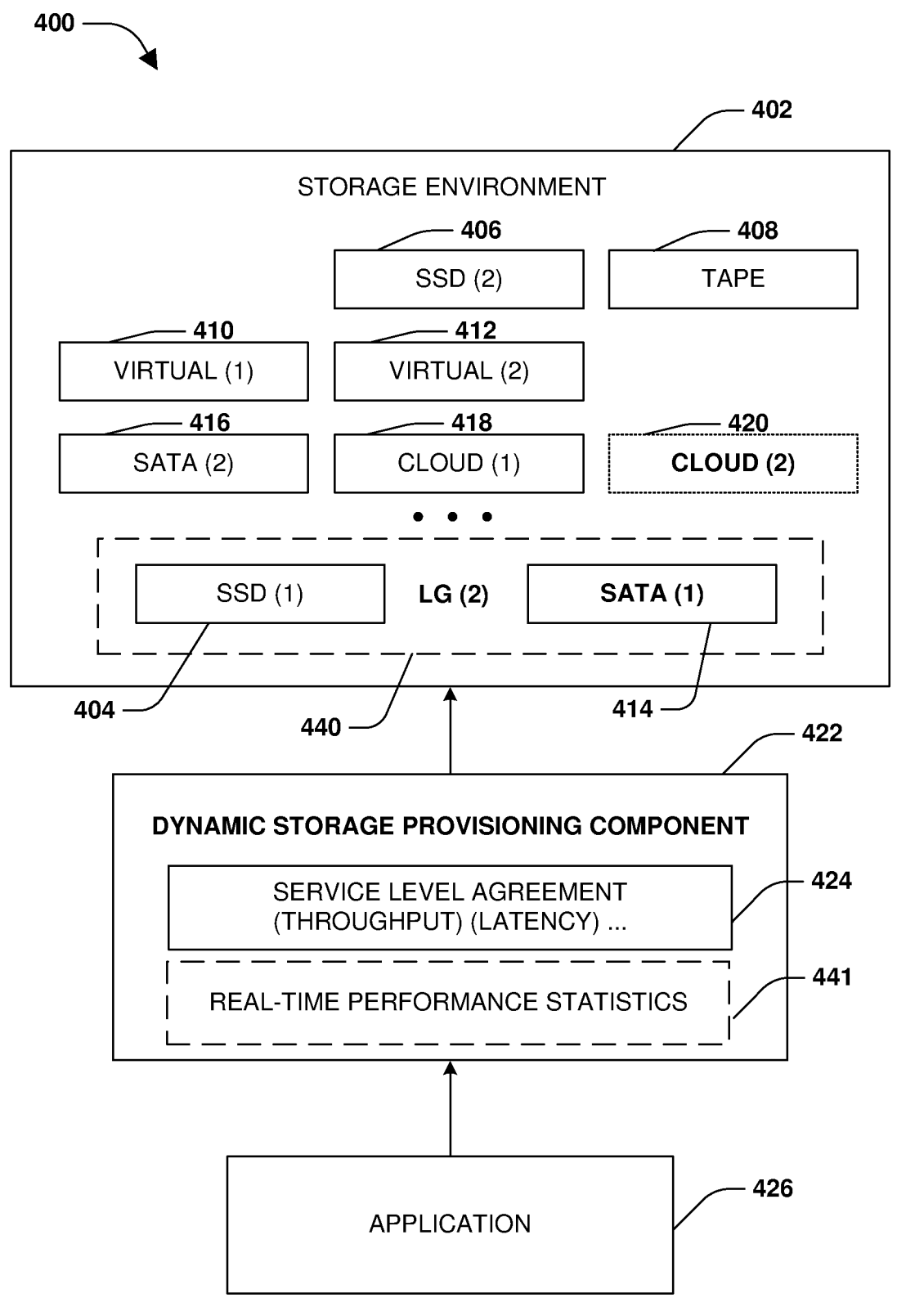
FIG. 4C is a component block diagram illustrating an exemplary system for dynamically provisioning a logical storage pool, where a second logical storage pool is dynamically provisioned.

FIG. 4C illustrates the dynamic storage provisioning component 422 collecting real-time performance statistics 441 corresponding to the first SSD storage device 404 and the second cloud storage 420 hosting the data of the application 426 (e.g., data access latency, throughput, etc.). The dynamic storage provisioning component 422 may compare the real-time performance statistics 441 against the service level agreement 424 to determine whether one or more storage devices within the first logical storage pool 430, of FIG. 4B, does not satisfy the service level agreement 424. For example, the dynamic storage provisioning component 422 may determine that the second cloud storage 420 does not satisfy the service level agreement 424 (e.g., a cloud storage service may provide relatively higher latency overtime than what is specified by the service level agreement 424, such as due to a network bandwidth decrease by the cloud storage service) based upon the real-time performance statistics 441.

Accordingly, the dynamic storage provisioning component 422 may determine that the first SATA storage device 414 may satisfy the service level agreement 424 (e.g., the first SATA storage device 414 may have historically provided relatively lower latency than what is specified by the service level agreement 424). The dynamic storage provisioning component 422 may construct a second logical storage pool 440 comprising the first SSD storage device 404 and the first SATA storage device 414 used to replace the second cloud storage 420. The dynamic storage provisioning component 422 may migrate data from the second cloud storage 420 to the first SATA storage device 414, and may provision the second logical storage pool 440, to replace the first logical storage pool 430, for the application 426. In an example of migrating data, the data may be migrated in a background (e.g., migrated by a storage controller within the storage environment 402; migrated by a background task; migrated by a service as opposed to a front-end application; etc.) without impacting front-end applications such as the application 426. The dynamic storage provisioning component 422 may release the second cloud storage 420 into an available storage pool of the storage environment 402.

Figure 4D:
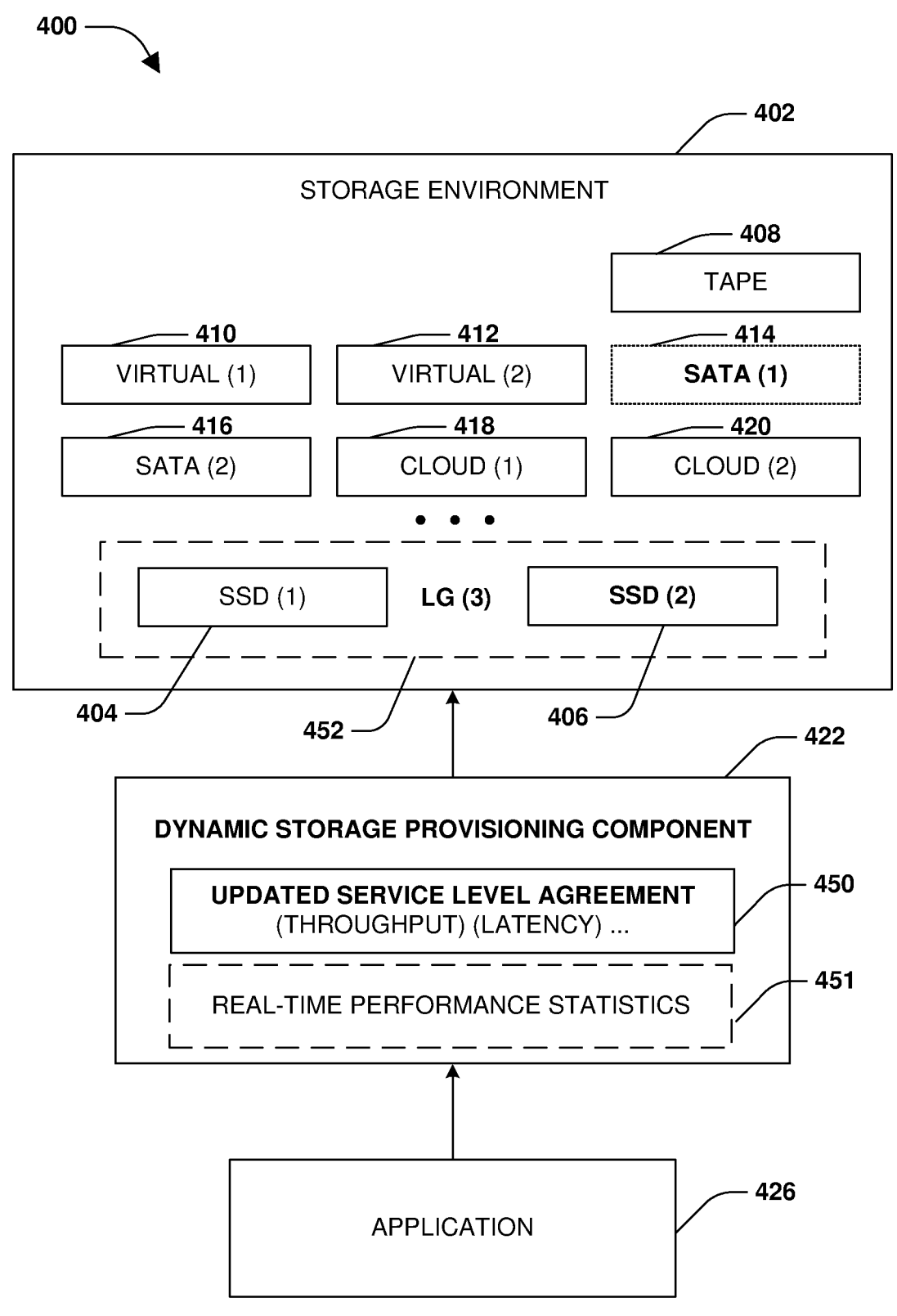
FIG. 4D is a component block diagram illustrating an exemplary system for dynamically provisioning a logical storage pool, where a third logical storage pool is dynamically provisioned.

FIG. 4D illustrates an example of the dynamic storage provisioning component 422 identifying an updated service level agreement 450 for the application 426. For example, the updated service level agreement 450 may specify a relatively larger data throughput than the service level agreement 424. The dynamic storage provisioning component 422 may collect real-time performance statistics 451 associated with the second logical storage pool 440, of FIG. 4C, hosting data of the application 426 within the first SSD storage device 404 and the first SATA storage device 414. The dynamic storage provisioning component 422 may evaluate the real-time performance statistics 451 against the updated service level agreement 450 to determine that the first SATA storage device 414 does not satisfy the larger data throughput specified by the updated service level agreement 450.

Accordingly, the dynamic storage provisioning component 422 may determine that the second SSD storage device 406 may satisfy the updated service level agreement 451 (e.g., the second SSD storage device 406 may have historically provided relatively high throughput bandwidth than what is specified by the updated service level agreement 450). The dynamic storage provisioning component 422 may construct a third logical storage pool 452 comprising the first SSD storage device 404 and the second SSD storage device 406 used to replace the first SATA storage device 414. The dynamic storage provisioning component 422 may migrate data from the first SATA storage device 414 to the second SSD storage device 406, and may provision the third logical storage pool 452, to replace the second logical storage pool 440, for the application 426. The dynamic storage provisioning component 422 may release the first SATA storage device 414 into the available storage pool of the storage environment 402.

Figure 4E:
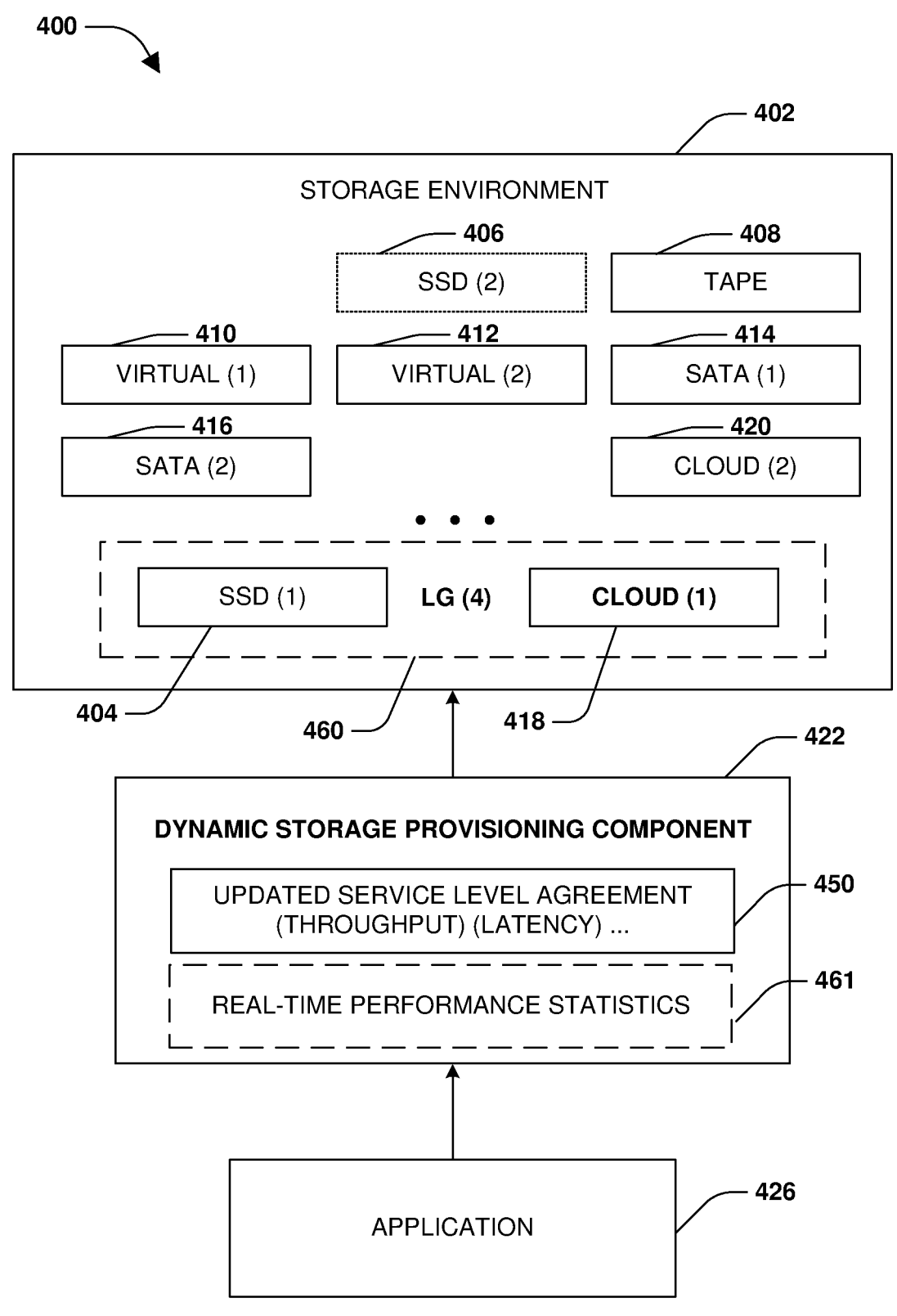
FIG. 4E is a component block diagram illustrating an exemplary system for dynamically provisioning a logical storage pool, where a fourth logical storage pool is dynamically provisioned.

FIG. 4E illustrates an example of the dynamic storage provisioning component 422 collecting real-time performance statistics 461 associated with the third logical storage pool 452, of FIG. 4D, hosting data of the application 426 within the first SSD storage device 404 and the second SSD storage device 406. The dynamic storage provisioning component 422 may compare the real-time performance statistics 461 against the updated service level agreement 450 to determine that the second SSD storage device 406 satisfies the updated service level agreement 450 and that a relatively more cost effective storage device may provide similar performance for the application 426 at a reduced monetary cost. For example, the dynamic storage provisioning component 422 may determine that both the second SSD storage device 406 and the first cloud storage 418 may provide the application 426 with access to data at a performance level that allows the application 426 to provide similar responsiveness to clients using the application 426.

Accordingly, the dynamic storage provisioning component 422 may construct a fourth logical storage pool 460 comprising the first SSD storage device 404 and the first cloud storage 418 used to replace the second SSD storage device 406. The dynamic storage provisioning component 422 may migrate data from the second SSD storage device 406 to the first cloud storage 418, and may provision the fourth logical storage pool 460, to replace the third logical storage pool 452, for the application 426. The dynamic storage provisioning component 422 may release the second SSD storage device 406 into the available storage pool of the storage environment 402.

Figure 5A:
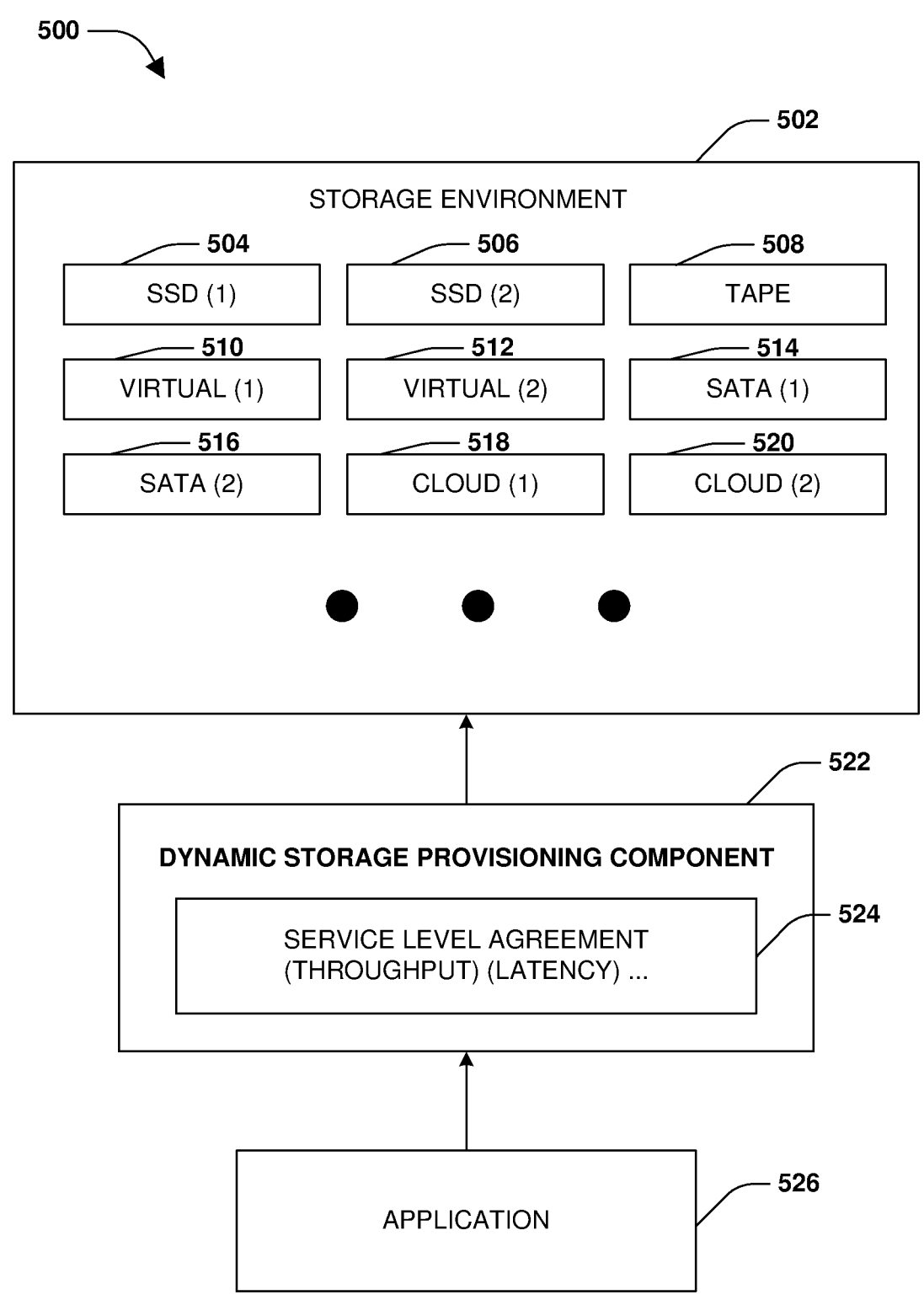
FIG. 5A is a component block diagram illustrating an exemplary system for dynamically provisioning a logical storage pool, where a pool of storage devices are identified.
Figure 5B:
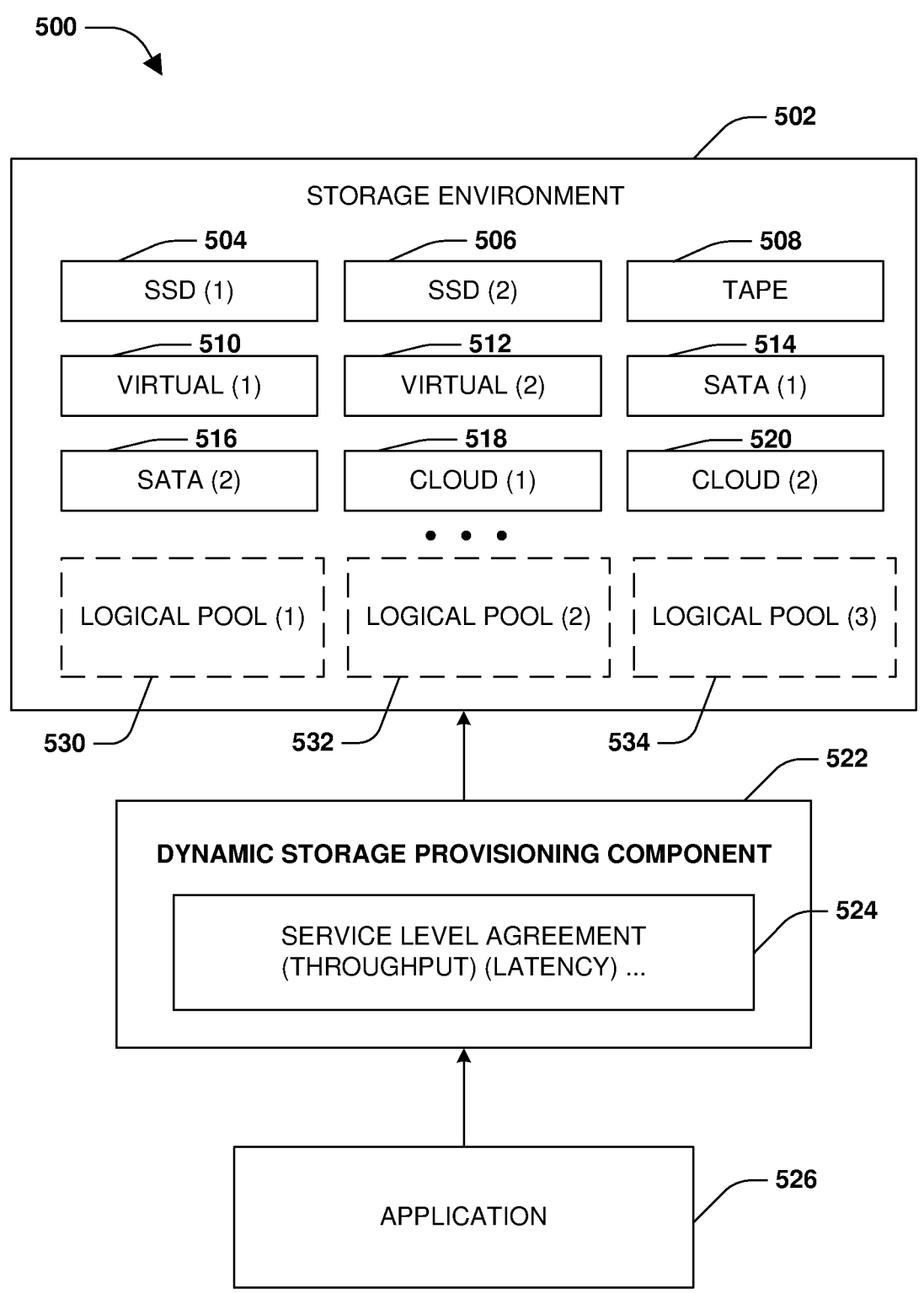
FIG. 5B is a component block diagram illustrating an exemplary system for dynamically provisioning a logical storage pool, where a first logical storage pool, a second logical storage pool, and a third logical storage pool are provisioned.
Figure 5C:
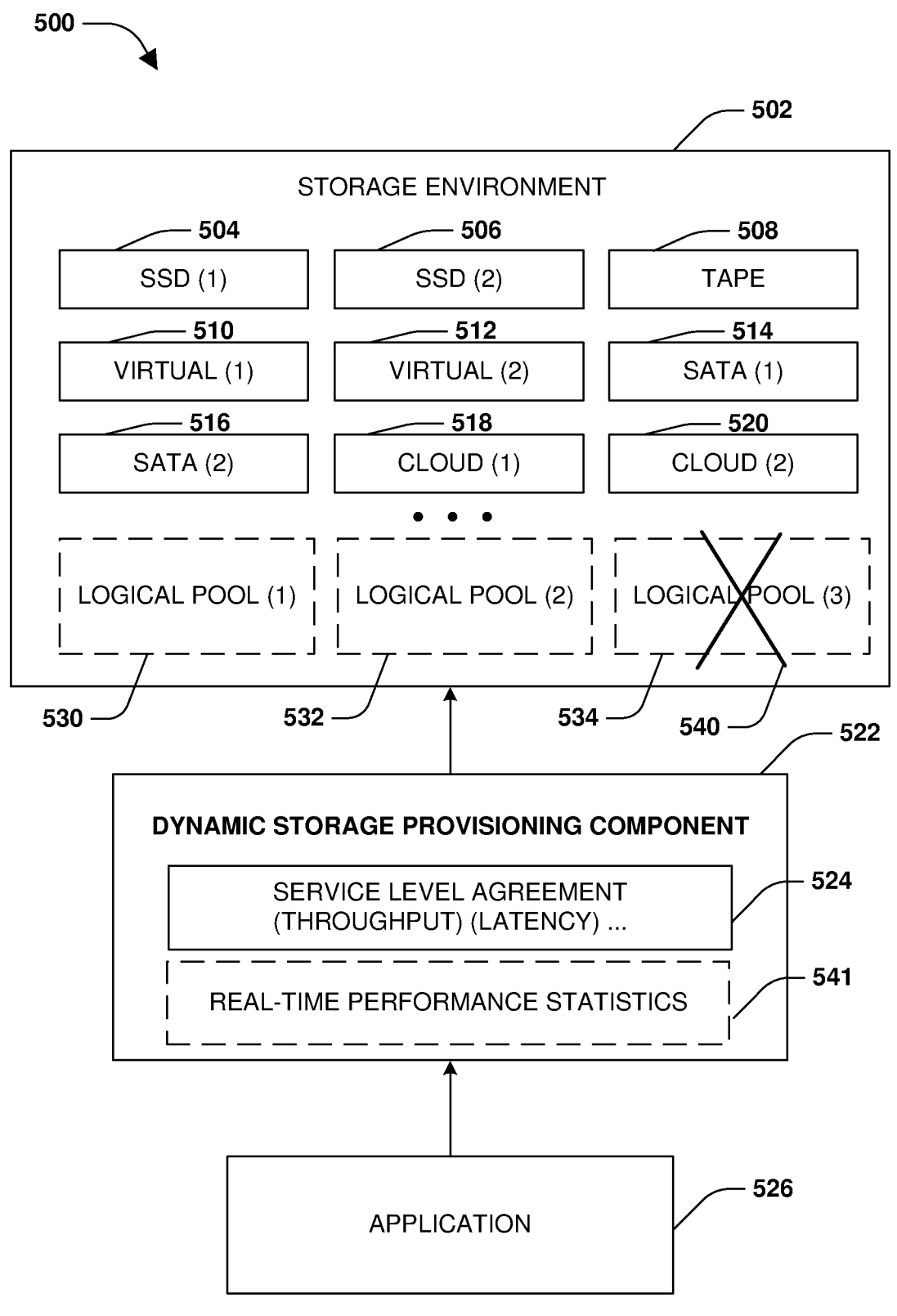
FIG. 5C is a component block diagram illustrating an exemplary system for dynamically provisioning a logical storage pool, where a third logical storage pool is released.

FIGS. 5A-5C illustrate examples of a system 500, comprising a dynamic storage provisioning component 522, for dynamically provisioning one or more logical storage pools of storage devices for an application 526. FIG. 5A illustrates the dynamic storage provisioning component 522 identifying a service level agreement (SLA) 524 for the application 526. The SLA 524 may specify various data access and/or performance metrics that are to be provided to the application 526 by a storage environment 502. The dynamic storage provisioning component 522 may evaluate the storage environment 502 to identify a pool of storage devices available for hosting data of the application 526. For example, the pool of storage devices may comprise a first SSD storage device 504, a second SSD storage device 506, a tape drive 508, first virtual storage 510, second virtual storage 512, a first SATA storage device 514, a second SATA storage device 516, first cloud storage 518, second cloud storage 520, and/or other storage devices or services.

FIG. 5B illustrates the dynamic storage provisioning component 522 constructing a first logical storage pool 530 to comprise one or more storage devices of the pool of storage devices, a second logical storage pool 532 to comprise one or more storage devices of the pool of storage devices, a third logical storage pool 534 to comprise one or more storage devices of the pool of storage devices, and/or other logical storage pools. The dynamic storage provisioning component 522 may construct the logical storage pools based upon the service level agreement 524, such that storage devices within a logical storage pool may satisfy the service level agreement 524. In this way, data of the application 526 may be stored within the first logical storage pool 530, the second logical storage pool 532, and/or the third logical storage pool 534 of the storage environment 502.

FIG. 5C illustrates the dynamic storage provisioning component 522 collecting real-time performance statistics 541 corresponding to the first logical storage pool 530, the second logical storage pool 532, and/or the third logical storage pool 534 hosting data of the application 526. The dynamic storage provisioning component 522 may compare the real-time performance statistics 541 against the service level agreement 524 to determine whether a logical storage pool does not satisfy the service level agreement 524. For example, the dynamic storage provisioning component 522 may determine that the third logical storage pool 534 does not satisfy the service level agreement 524 (e.g., a storage device within the third logical storage pool 534 may provide relatively higher latency overtime than what is specified by the service level agreement 524) based upon the real-time performance statistics 541. Accordingly, the dynamic storage provisioning component 522 may migrate data of the third logical storage pool 534 to a different logical storage pool, such as a new logical storage pool or an existing logical storage pool (e.g., the first logical storage pool 530 and/or the second logical storage pool 523), that may satisfy the service level agreement 524. In an example of migrating data, the data may be migrated in a background (e.g., migrated by a storage controller within the storage environment 502; migrated by a background task; migrated by a service as opposed to a front-end application; etc.) without impacting front-end applications such as the application 526. The dynamic storage provisioning component 522 may remove the third logical storage pool 534. In this way, logical storage pools that comprise storage devices that do not satisfy the service level agreement 524 may be removed so that one or more logical storage pools that do satisfy the service level agreement 524 may be used for the application 526.

Figure 6:
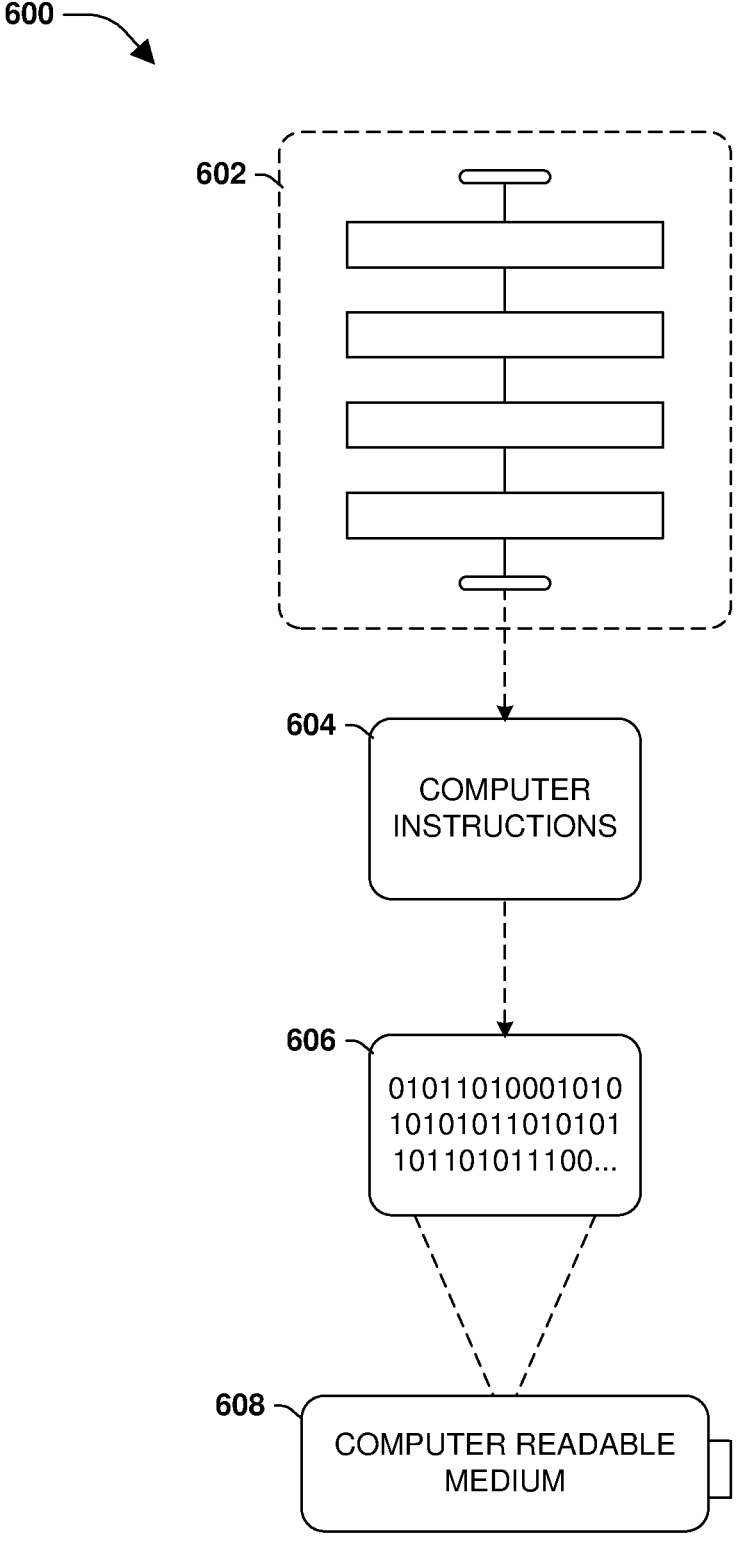
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-ft DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable instructions 604 are configured to implement a system, such as at least some of the exemplary system 400 of FIGS. 4A-4E and/or at least some of the exemplary system 500 of FIGS. 5A-5C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

provisioning, by a dynamic storage provisioning component hosted remote to cloud storage, a storage pool for utilization an application based upon storage characteristics, wherein the storage pool is comprised of a first set of storage selected from available storage source that includes the cloud storage;

identifying a change in the storage characteristics of the application as changed storage characteristics;

collecting performance statistics from the first set of storage of the storage pool, wherein the collecting comprises the dynamic storage provisioning component measuring a latency of the application accessing over a network, through the dynamic storage provisioning component, the cloud storage hosted remote to the application and the dynamic storage provisioning component, wherein the latency is measured with respect to network bandwidth associated with the application remotely accessing the cloud storage over the network; and utilizing the changed storage characteristics and the performance statistics collected from the first set of storage to modify the storage pool to comprise a second set of storage selected from the available storage sources as a modified storage pool.

2. The method of claim 1, comprising:

hosting the storage pool through a storage system that provides access to local storage resources, remote storage resources, and cloud storage resources as the available storage sources, wherein the storage pool is comprised of storage from two or more of the local storage resources, remote storage resources, and cloud storage resources.

3. The method of claim 1, comprising:

determining that the performance statistics of the storage pool do not satisfy the changed storage characteristics of the application; and automatically replacing a storage device type of the first set of storage with a different storage device type of the second storage to dynamically and automatically increase performance of the application.

4. The method of claim 1, comprising:

migrating, by a storage controller within a storage environment remote to the application, data of the application from the first set of storage to the second set of storage without impacting the application.

5. The method of claim 1, wherein the application is a database application, and wherein the method comprises:

transparently storing database data of the database application through the storage pool within a select storage device selected from the first set of storage of the storage pool based upon a service level agreement, wherein a service migrates the database data based upon the performance statistics and latency without impacting execution of the database application.

6. The method of claim 1, comprising:

migrating data of the application from the first set of storage to the second set of storage as a background task performed by a storage controller as a service that does not impact execution of the application hosted as a front-end application.

7. The method of claim 1, comprising:

modifying the storage pool in response to identifying the change in the storage characteristics of the application based upon a client updating a service level agreement for the application, wherein the service level agreement is updated with a new acceptable latency for the application.

8. The method of claim 1, comprising:

identifying the change in the storage characteristics of the application based upon a client updating a service level agreement for the application; and modifying the storage pool in response to determining that a data throughput specified by the service level agreement is not satisfied by the first set of storage.

9. The method of claim 1, comprising:

tracking historic throughput bandwidth of the first set of storage as the performance statistics.

10. A storage system comprising memory storing instructions and comprising a processor configured to execute the instructions to implement a dynamic storage provisioning component of a storage system to perform operations comprising:

provisioning, by the dynamic storage provisioning component hosted remote to cloud storage, a storage pool for utilization an application based upon storage characteristics, wherein the storage pool is comprised of a first set of storage selected from available storage source that includes the cloud storage;

identifying a change in the storage characteristics of the application as changed storage characteristics;

collecting performance statistics from the first set of storage of the storage pool, wherein the collecting comprises the dynamic storage provisioning component measuring a latency of the application accessing over a network, through the dynamic storage provisioning component, the cloud storage hosted remote to the application and the dynamic storage provisioning component, wherein the latency is measured with respect to network bandwidth associated with the application remotely accessing the cloud storage over the network; and utilizing the changed storage characteristics and the performance statistics collected from the first set of storage to modify the storage pool to comprise a second set of storage selected from the available storage sources as a modified storage pool.

11. The storage system of claim 10, wherein the operations comprise:

removing a storage device from the storage pool based upon the changed storage characteristics and the performance statistics indicating that a service level agreement is not satisfied.

12. The storage system of claim 10, wherein the operations comprise:

adding a storage device to the storage pool based upon the changed storage characteristics and the performance statistics.

13. The storage system of claim 10, wherein the operations comprise:

dynamically swapping a first storage device with a second storage device based upon the changed storage characteristics and the performance statistics.

14. The storage system of claim 10, wherein the operations comprise:

dynamically tracking real-time performance statistics of the storage pool.

15. A non-transitory machine readable medium comprising instructions for performing a method, which when executed by a machine, causes the machine to perform operations comprising:

provisioning, by a dynamic storage provisioning component hosted remote to cloud storage, a storage pool for utilization an application based upon storage characteristics, wherein the storage pool is comprised of a first set of storage selected from available storage source that includes the cloud storage;

identifying a change in the storage characteristics of the application as changed storage characteristics;

collecting performance statistics from the first set of storage of the storage pool, wherein the collecting comprises the dynamic storage provisioning component measuring a latency of the application accessing over a network, through the dynamic storage provisioning component, the cloud storage hosted remote to the application and the dynamic storage provisioning component, wherein the latency is measured with respect to network bandwidth associated with the application remotely accessing the cloud storage over the network; and utilizing the changed storage characteristics and the performance statistics collected from the first set of storage to modify the storage pool to comprise a second set of storage selected from the available storage sources as a modified storage pool.

16. The non-transitory machine readable medium of claim 15, comprising:

hosting the storage pool through a storage system that provides access to local storage resources, remote storage resources, and cloud storage resources as the available storage sources, wherein the storage pool is comprised of storage from two or more of the local storage resources, remote storage resources, and cloud storage resources.

17. The non-transitory machine readable medium of claim 15, comprising:

determining that the performance statistics of the storage pool do not satisfy the changed storage characteristics of the application; and automatically replacing a storage device type of the first set of storage with a different storage device type of the second storage to dynamically and automatically increase performance of the application.

18. The non-transitory machine readable medium of claim 15, comprising:

migrating, by a storage controller within a storage environment remote to the application, data of the application from the first set of storage to the second set of storage without impacting the application.

19. The non-transitory machine readable medium of claim 15, wherein the application is a database application, and wherein the method comprises:

transparently storing database data of the database application through the storage pool within a select storage device selected from the first set of storage of the storage pool based upon a service level agreement, wherein a service migrates the database data based upon the performance statistics and latency without impacting execution of the database application.

20. The non-transitory machine readable medium of claim 15, comprising:

migrating data of the application from the first set of storage to the second set of storage as a background task performed by a storage controller as a service that does not impact execution of the application hosted as a front-end application.

\* \* \* \* \*